(12) United States Patent
Hansen et al.

(10) Patent No.: US 11,752,719 B2
(45) Date of Patent: Sep. 12, 2023

(54) FOOTWEAR INJECTION MOULD

(71) Applicant: ECCO Sko, Bredebro (DK)

(72) Inventors: Hans Christian Hansen, Bredebro (DK); Malte Jakobsen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 0 days.

(21) Appl. No.: 17/337,031

(22) Filed: Jun. 2, 2021

(65) Prior Publication Data

US 2021/0379853 A1   Dec. 9, 2021

(30) Foreign Application Priority Data

Jun. 3, 2020   (EP) ..................... 20177958

(51) Int. Cl.
*B29D 35/00* (2010.01)
*B29D 35/12* (2010.01)

(52) U.S. Cl.
CPC ....... *B29D 35/0027* (2013.01); *B29D 35/122* (2013.01)

(58) Field of Classification Search
CPC ............ B29D 35/0018; B29D 35/0027; B29D 35/0036; B29D 35/122
See application file for complete search history.

(56) References Cited

U.S. PATENT DOCUMENTS

| | | | | |
|---|---|---|---|---|
| 3,447,251 A | * | 6/1969 | Erich ................... | B29D 35/065 425/119 |
| 3,523,333 A | * | 8/1970 | Taylor ................ | B29D 35/0018 425/119 |
| 3,547,602 A | * | 12/1970 | Taylor ................. | B29D 35/148 29/463 |
| 3,677,679 A | * | 7/1972 | Christie ................ | A43D 89/00 425/441 |
| 3,799,494 A | * | 3/1974 | McLean, Jr. .......... | B29C 44/428 425/572 |
| 4,134,955 A | * | 1/1979 | Hanrahan, Jr. .......... | A43B 1/04 425/129.2 |
| 4,440,377 A | * | 4/1984 | Hujik ..................... | B29C 33/26 264/328.8 |

(Continued)

FOREIGN PATENT DOCUMENTS

| | | |
|---|---|---|
| WO | WO2011054509 | 5/2011 |
| WO | WO2013143541 | 10/2013 |

OTHER PUBLICATIONS

EP extended Search Report from corresponding EP Patent Application No. 20177958.4 dated Oct. 22, 2020, 7 pages.

*Primary Examiner* — Emmanuel S Luk
(74) *Attorney, Agent, or Firm* — Lee & Hayes, P.C.

(57) ABSTRACT

A footwear injection mould for Direct Injection moulding of footwear parts, where the mould comprises: a first mould cavity defining a first footwear part, a second mould cavity defining a second footwear part, a first side frame defining at least a part of a first side of the first and second mould cavities, a second side frame defining at least a part of a second side of the first and second mould cavities, and a bottom frame defining at least a part of the first and second mould cavities, where the first and/or the second side frame define(s) at least a part of a first injection channel which is in fluid communication with the first mould cavity and the second mould cavity.

14 Claims, 3 Drawing Sheets

(56) References Cited

U.S. PATENT DOCUMENTS

| | | | |
|---|---|---|---|
| 5,871,683 A * | 2/1999 | Schaper | B29C 45/2673 |
| | | | 249/102 |
| 2006/0110487 A1 | 5/2006 | Bergmann et al. | |
| 2007/0193068 A1* | 8/2007 | Calvano | B29D 35/128 |
| | | | 264/297.8 |
| 2015/0050379 A1* | 2/2015 | Ginns | B29D 35/10 |
| | | | 425/500 |
| 2016/0257084 A1* | 9/2016 | Chen | B29C 39/10 |
| 2018/0056573 A1* | 3/2018 | Chang | B22C 9/02 |
| 2019/0073709 A1 | 3/2019 | Hayes et al. | |

* cited by examiner

FOOTWEAR INJECTION MOULD

This Application claims priority to EP20177958.4, filed Jun. 3, 2020, which is incorporated herein by reference.

TECHNICAL FIELD

Footwear injection mould for direct injection moulding of footwear parts.

BACKGROUND

In footwear production, and especially in direct injection footwear production, large and expensive machines are used to inject footwear parts onto lasted uppers. The machinery is expensive, and the moulds that are used to produce the footwear parts may also be very expensive. The moulds are often made out of metal, such as aluminium, where each mould defines the mould cavity for one shoe. Thus, there is a need to produce at least two moulds in order to produce a left shoe and a right shoe which define a footwear part. Furthermore, for the production of a certain type of shoe it may be necessary to provide numerous different shoe sizes, where each size may require two moulds.

Thus, in order to reduce the use of aluminium, to reduce the number of moulds necessary to produce shoes and to increase the efficiency of shoe production, there is a need for improvement.

GENERAL DESCRIPTION

In accordance with the present description, there is provided a footwear injection mould for Direct Injection moulding of footwear parts, where the mould comprises: a first mould cavity defining a first footwear part, a second mould cavity defining a second footwear part, a first side frame defining at least a part of a first side of the first and second mould cavities, a second side frame defining at least a part of a second side of the first and second mould cavities, and a bottom frame defining at least a part of the first and second mould cavities,
where the first and/or the second side frame define(s) at least a part of a first injection channel which is in fluid communication with the first mould cavity and the second mould cavity.

The provision of a first mould cavity and a second mould cavity allows a footwear injection mould to be used for the production of two separate footwear parts at the same time, where the injection material may be introduced at the same time into both mould cavities, thereby increasing the efficiency of the use of a footwear injection mould.

At least a part of the first injection channel may be defined in the first side frame and/or the second side frame and where the first injection channel is in fluid communication with both mould cavities. This means that when an injection material is injected into the footwear injection mould via the first injection channel, the injection material may be introduced into the first mould cavity and the second mould cavity simultaneously. In one example of the present invention, one or two articles of footwear may be introduced into the first mould cavity and/or the second mould cavity, where the mould may be closed, and the injection material is introduced into the mould cavities so that the injected material may bond with the article of footwear when the injected material expands and cures inside the mould cavity. Subsequently, the footwear injection mould may be opened, and the first and/or the second article of footwear may be removed from the footwear injection mould, where the moulded footwear part is formed and bonded to the first and/or the second article of footwear.

The provision of two mould cavities allows for the manufacturing of two articles of footwear at any one time, where the first mould cavity may be used for a first article of footwear, and the second mould cavity may be used for a second article of footwear. Moreover, by providing one injection channel in fluid communication with two mould cavities it is possible to use one single injection nozzle to provide injected material to both cavities.

Furthermore, in Direct Injection moulding, the machinery is often in the form of a rotary table having a plurality of clamping units for each footwear mould. The rotary table rotates around an axis, where the injection is performed at a specific position around the table, allowing a clamping unit to be rotated towards the specific position for injection. Thus, by providing two mould cavities in a single injection mould, a single clamping unit of the rotary table can produce two articles of footwear at one position for injection moulding. Traditionally, a single mould cavity only allows for one article of footwear to be attached to a single clamping unit of a rotary table. Thus, it is possible to decrease the production time for a single article of footwear and thereby reduce the cost of manufacturing.

In one exemplary embodiment, the injection channel may be in the form of a groove positioned in the first and/or the second side frame, where the groove defines at least a part of the cross-sectional periphery of the channel. The groove may be defined in a region of the first and/or the second side frame which may be outside the region of the first and/or the second side frame defining the first and/or the second mould cavity. When the footwear mould is in its open position, the groove may be open to the outside. When the mould is closed, the cross-sectional periphery of the groove may be closed so that the injection channel extends along the length of the mould. The cross-sectional periphery of the groove may be closed (having a boundary along its entire periphery) using an opposite side frame and/or using the bottom frame, where the opposite side frame and/or the bottom frame provide(s) the remaining periphery of the groove when the mould is closed.

The fluid communication between the first injection channel and the first mould cavity and/or the second mould cavity may extend from outside the mould and into the mould cavities. Thus, the first injection channel may extend from an outer surface of the footwear injection mould through at least parts of the mould and provide at least a part of the fluid communication into the first mould cavity and the second mould cavity. This means that the mould may be closed during the manufacturing of the shoe part, where a nozzle, which is outside the mould, is positioned in fluid communication with the first injection channel so that when the nozzle releases the injection material, the injection material may flow in a liquid state via the first injection channel into the first mould cavity and the second mould cavity.

The first mould cavity and the second mould cavity may be separated by a part of the footwear injection mould so that the cavities are separated from each other.

In one exemplary embodiment, the first side frame may define approximately half of a mould cavity for one or more footwear parts, while the second side frame may define approximately half of a mould cavity for one or more footwear parts. Thus, the first side frame and the second side frame, when combined, may define a full mould cavity for one or more footwear parts.

In one exemplary embodiment, the first side frame may define a lateral and/or a medial mould part for a footwear part, while the second side frame may define a medial and/or a lateral mould part of the footwear part. This means that the first side part may define one side of a mould assembly for a footwear part, while the second side part may define the opposite side of a mould assembly for a footwear part.

In one or more exemplary embodiments, the first side part and the second side part may be separated along a longitudinal extension of the mould cavity, where the separation may e.g. be a vertical separation.

In one or more exemplary embodiments, the first side frame, the second side frame and the bottom frame may be separated mould parts. Thus, the first side frame may be maneuvered relative to the second side frame and/or the bottom frame, the second side frame may be maneuvered relative to the first side frame and/or the bottom frame, and the bottom frame may be maneuvered relative to the first side frame and/or the second side frame.

In one or more exemplary embodiments, the bottom frame may define at least part of a ground contacting surface of the article of the footwear, and/or where the first side frame may define at least a part of the lateral and/or medial part of the footwear part and/or where the second side frame may define at least a part of the lateral and/or medial part of the footwear part.

In one embodiment, the first side part and the second side part are configured to be maneuvered between an open position, where the first side part is at a distance from the second side part, and a closed position, where the first side part may abut a part of the second side part. The first side part and the second side part may be maneuvered relative to each other in a transverse direction, where the transverse direction may e.g. be in a horizontal direction, where the first side part may have a first distance from the second side part in an open position, and the first side part may have a second distance from the second side part in a closed position, where the first distance is larger than the first distance.

In one embodiment, the first frame part may define a first horizontal side boundary of a mould cavity, and the second frame part may define a second horizontal side boundary of a mould cavity, and/or where the bottom frame part may define a first vertical (bottom) boundary of a mould cavity and/or where an upper may define a second vertical (upper) boundary of a mould cavity.

In one exemplary embodiment, the injected material in a liquid state enters the first and/or the second mould cavity, where the amount of material is predetermined in relation to the volume of the mould cavities in order to ensure that there is sufficient injected material to fill the first and/or the second mould cavity when the injected material cures. When the injection material is introduced into the mould, the volume of the material is less than the volume of the cavity. However, when the material has entered the cavity, the curing of the material occurs by way of expansion and cooling of the material so that the injected material increases in volume and expands into the volume of the mould cavity. Upon curing, the mould may be opened, and the article of footwear may be removed from the mould.

In one exemplary embodiment, the first injection channel may be configured to be defined when the footwear injection mould is in its closed state. The first injection channel may have a cross-sectional diameter, which may be seen in a plane that is orthogonal to the central axis of the first injection channel. The cross-sectional diameter may be seen as the width of the first injection channel and may define the bore of the injection channel, which in turn defines the volume of the injection channel when the length of the injection channel is introduced. The boundary of the first cross-sectional diameter may be defined as matching with the cross-sectional diameter of the first injection channel, where the boundary of the first cross-sectional diameter may be the inner wall of the first injection channel. The inner wall of the first injection channel may be defined by one or more of the first side frame, the second side frame and the bottom frame. The inner wall of the first injection channel may be defined by the inner wall of the first and/or the second side frame or may be defined by the outer wall of the bottom frame.

In one exemplary embodiment, the first injection channel may comprise a first output port in fluid communication with the first mould cavity and a second output port in fluid communication with the second mould cavity. The first injection channel may be in the form of a fluid communication channel which extends from one position of the footwear injection mould towards a second position of the footwear injection mould. The part of the first injection channel or the second injection channel that is in fluid communication with the first mould cavity or the second mould cavity may be in the form of a first output port and a second output port, respectively, where the first output port and the second output port may be in fluid communication with the first injection channel. The first output port and the second output port may open into the first mould cavity and the second mould cavity so that when a material is injected into the first injection channel, the injected material may be configured to flow through the first injection channel and exit the first injection channel via the first output port and/or the second output port, where the injected material will enter the first mould cavity and/or the second mould cavity via the output ports.

In one exemplary embodiment, the first output port may be in fluid communication with the second output port. The first output port and the second output port may be formed as a forked section of the first injection channel in a distal end of the first injection channel. The first injection channel may divide into at least two output injection channels, where the injected material that is configured to flow from a proximal end of the first injection channel to the second end of the first injection channel may flow into the two output injection channels, which terminate in a first output port and a second output port. This means that the material that flows through the first injection channel may be divided into at least two output flows, where the first output flow enters the first mould cavity, and the second output flow enters the second mould cavity.

In one exemplary embodiment, the first injection channel may comprise a first input port. The first input port may be positioned in a proximal end of the first injection channel, where the first input port is configured to allow an injection nozzle to be connected to the first injection channel to provide a flow of injection material from the first input port into the first injection channel. The first injection channel is in fluid communication with both the first mould cavity and the second mould cavity, which means that the mould is configured to fill both mould cavities with the injected material, using one injection nozzle of a Direct Injection moulding manufacturing device, where the injected material flows into both cavities.

The first input port may be formed in the first side frame and/or the second side frame. This means that the first input port may be fully formed by a single side frame, where the input port may be an opening from the outside (outer wall) of one of the side frames and where the input port may be in fluid communication with the first injection channel, which may be formed by an inner wall of the side frame. Alternatively, the first input port may be formed by the first side frame and the second side frame so that when the first side frame and the second side frame are in their closed position, the side frames define the first input port and/or parts of the first injection channel.

The inner wall of the first side frame and/or the second side frame may be a wall that faces the outside of the footwear injection mould when it is in its closed state. An inner wall of the first side frame and/or the second side frame may be a wall that is in contact with an opposing side frame and/or the bottom frame, and/or it may be a wall that forms a part of the first and/or the second mould cavity of the footwear injection mould. An outer wall of the bottom frame may be a wall that faces the first and/or the second side frame, or it may be a wall that defines a part of the first and/or the second mould cavity of the footwear injection mould.

In one exemplary embodiment, the first injection channel may be at least partly defined by the bottom frame. The first injection channel may be partly formed by the first side frame and/or the second side frame, where in a cross-section the first side frame forms a part of the boundary of the first injection channel. When the mould is closed, and the outer wall of the bottom frame abuts the inner wall of the first and/or the second side frame, the outer wall of the bottom side frame may define a part of the boundary of the first injection channel so that the outer wall of the bottom frame defines an inner periphery of the first injection channel. Thus, the inner periphery of the first injection channel may be defined by the bottom frame and the side frame in such a manner that the first injection channel has a closed inner periphery which is partly defined by the inner wall of the side frame and the outer frame of the bottom frame.

In one exemplary embodiment, the first injection channel may define an injection channel volume, where the injection channel volume may be at least partly defined by a side wall of the bottom frame and/or a side wall of the first side frame and/or the second side frame. The first injection channel may be at least partly defined by one or more frames of the footwear injection mould, and the first injection channel may, in different longitudinal positions, be defined by different parts of the footwear injection mould. This means that in one longitudinal position, the first injection channel may be defined by a side frame and the bottom frame, while in a different longitudinal position, the first injection channel may be defined by the first side frame and the second side frame, where the first injection channel may transform from one configuration to another configuration along the length of the injection channel. The configuration of the injection channel may change in one or more longitudinal positions so that the first injection channel may be defined by one or more parts of the footwear mould in a first position and may be defined by a second configuration of the footwear mould in a second position, where the first configuration and the second configuration are different from each other. The first configuration, as an example, may be a combination of the first and/or the second side frame and the bottom frame, where the second configuration may be a combination of the first and the second side frame. A third configuration may be where the first injection channel may be defined by one frame of the injection mould at a third longitudinal position. The footwear injection mould may have one configuration of the first injection channel at any specific longitudinal position, where one configuration may transform into another configuration when the first injection channel extends in a longitudinal position.

In one exemplary embodiment, the first injection channel may define an injection channel volume, where the injection channel volume may be at least partly defined by a side wall of the first side frame and a side wall of the second side frame. The injection channel volume may be a product of a cross-sectional dimension of the first injection channel and a predefined length of a part of the first injection channel. The first side wall of the first side frame may be provided with a first groove, where the groove defines at least a part of the volume of the first injection channel and where the second side wall of the second side frame may be provided with a second groove, where the groove defines at least a part of the volume of the first injection channel. When the footwear injection mould is closed, the first groove and the second groove may face each other so that the two grooves define at least a part of the volume of the first injection channel. Thus, when the injected material flows along the longitudinal length of the first injection channel, the first side frame and the second side frame define the radial boundaries of the first injection channel.

In one exemplary embodiment, the first mould cavity may be positioned in a proximal part of the mould, and/or the second mould cavity may be positioned in a distal part of the mould. The footwear injection mould may have a longitudinal length that is longer than the width of the footwear injection mould when the mould is in its closed position. The mould may have a proximal end which is configured to face outwards, while the mould may have a distal end that faces inwards towards the injection moulding machinery, which may e.g. be a rotary injection moulding machine, where the distal end faces the rotational axis of the machine, and the proximal end faces away from the rotational axis of the machine. The mould may be arranged in such a way that the first mould cavity is positioned at a first distance from the proximal end of the footwear injection mould, while the second mould cavity is positioned at a second distance from the proximal end of the footwear injection mould, where the first distance is greater than the second distance.

In one exemplary embodiment, the first distance does not overlap the second distance. Thus, the first mould cavity and the second mould cavity do not overlap in a longitudinal direction along the footwear injection mould. The first footwear mould may be positioned so that the distal end of the first mould cavity is positioned in a more proximal part of the mould cavity than the proximal end of the second mould cavity. This may mean that a longitudinal and/or a central axis of the footwear injection mould will intersect both the first and second mould cavities. This may also mean that the first mould cavity and the second mould cavity may be defined by the first side frame, the second side frame and the bottom frame.

In one exemplary embodiment, the first injection channel may extend from a proximal end of the mould and in a longitudinal direction towards the distal end of the mould. Thus, the first injection channel may provide access to the first and second mould cavities from the proximal end of the footwear injection mould. The first injection channel may extend in a longitudinal direction towards the distal end of the footwear injection mould, where the first injection channel provides fluid communication in a longitudinal direction along the length of the footwear injection mould.

In one exemplary embodiment, the first injection channel may extend into a region between the first mould cavity and the second mould cavity. The first mould cavity and the second mould cavity may be separated by a part of the footwear injection mould so that the volumes of the cavities are separated from each other. The first injection channel may extend into the part of the mould which separates the first and the second mould cavities, which means that the first injection channel may provide fluid communication into the mould cavities from the area/region of the mould which separates the first mould cavity from the second mould cavity.

In one exemplary embodiment, the first injection channel may extend into a distal end of the first mould cavity and/or a proximal end of the second mould cavity. The distal end of the first mould cavity is the end of the first mould cavity that faces away from the proximal end of the mould, while the proximal end of the second mould cavity is the end of the second mould cavity that faces the proximal end. By providing the first injection channel in fluid communication with the distal end of the first mould cavity and/or the proximal end of the second mould cavity, the first injection channel may extend into a central region of the mould in order to provide fluid communication with the first and/or the second mould cavity. This may also mean that when the injection material is injected into the first mould cavity, it is injected in a direction towards the proximal end, and/or when the injection material is injected into the second mould cavity, the material may be injected in a direction towards the distal end of the mould. In one embodiment, the injection material may be injected in opposite directions into the first mould cavity and the second mould cavity.

The first injection channel may extend from the proximal end of the mould into a central region of the mould, where the central region of the mould may separate the first mould cavity from the second mould cavity when the footwear injection mould is in its closed position/state.

In one exemplary embodiment, the first mould cavity and/or the second mould cavity may extend along a longitudinal axis of the footwear injection mould. This means that the longitudinal axis of the footwear injection mould may intersect the first mould cavity and the second mould cavity, and that the mould cavities are positioned at different longitudinal positions of the mould.

In one exemplary embodiment, the article of footwear may be configured for a child. This may mean that the size of the shoe is relatively small so that the combined length of the first article of footwear and the second article of footwear is shorter than the length of the footwear injection mould.

In one exemplary embodiment, the footwear part may be a footwear sole. By the provision of a footwear part in the form of a footwear sole, it may be possible to mould two separate articles of footwear at a time, where the sole of the shoe is attached to the upper using Direct Injection moulding, where the upper is positioned inside the mould cavity, and the upper defines the upper boundary of the mould cavity, while the first side frame, the second side frame and the bottom frame define the sides and the bottom of the mould cavity.

In one embodiment, the footwear part may be configured to be attached to the upper using Direct Injection moulding, where the upper is positioned inside the mould cavity, and the upper defines the upper boundary of the mould cavity, while the first side frame, the second side frame and the bottom frame define the sides and the bottom of the mould cavity.

In one exemplary embodiment, the footwear mould may be a part of a footwear assembly, where the footwear assembly further comprises a first footwear last and a second footwear last to be inserted into the first mould cavity and the second mould cavity, respectively.

Various exemplary embodiments and details are described below with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practised in any other embodiments, even if not so illustrated or not so explicitly described.

BRIEF DESCRIPTION OF THE DRAWINGS

The following is an explanation of exemplary embodiments with reference to the drawings, in which.

DETAILED DESCRIPTION

Figure 1:
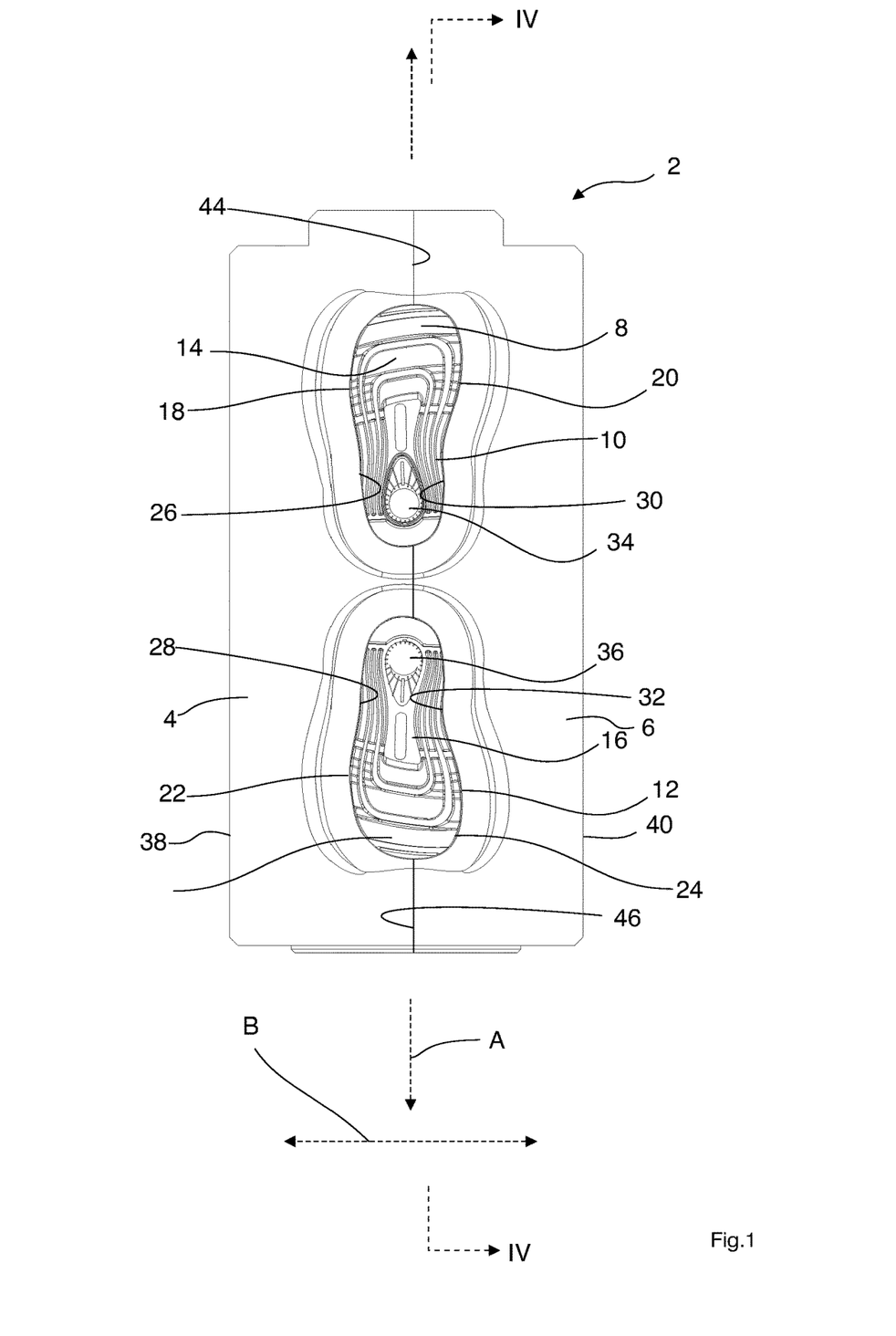
FIG. 1 is a top view of a footwear injection mould.

FIG. 1 shows a top view of a footwear injection mould 2 in a closed state, where the footwear injection mould comprises a first side frame 4, a second side frame 6 and a bottom frame 8. The first side frame 4, the second side frame 6 and the bottom frame 8 define at least parts of a first mould cavity 10 and a second mould cavity 12. The first mould cavity 10 may define a first footwear part, while the second mould cavity 12 may define a second footwear part. The first side frame 4, the second side frame 6 and the bottom frame 8 define an inner surface of the first mould cavity 12 and the second mould cavity 10, where the inner surface is configured to define an outer surface of the footwear part to be injected. The first mould cavity 10 and the second mould cavity 12 in their closed state have a first opening 14 and a second opening 16, where the first opening 14 and the second opening 16 have a form which is adapted to mate with an outer surface of a lasted upper (not shown) so that a primary lip 18 and a secondary lip 20 of the first mould cavity 10 and a primary lip 22 and a secondary lip 24 of the second mould cavity 12 are in contact with an outer surface of a lasted upper in order to close the first opening 14 and the second opening 16 prior to or during an injection moulding process of the footwear part. Thus, the lasted upper operates as an upper boundary of the first mould cavity 10 and the second mould cavity 12 when the first footwear part is injected directly onto a first lasted upper, and the second footwear part is injected directly onto a second lasted upper.

Alternatively, in case the footwear part is not to be injected directly onto an upper, the mould openings 14 and 16 may be provided with an upper mould part (not shown) which may close the mould openings 14 and 16 and which may possibly have an inner surface (facing the mould cavity), e.g. in the form of a sole-contacting surface of an upper, allowing the footwear part to be adhered to an upper after the injection moulding process of the footwear part.

Figure 2:
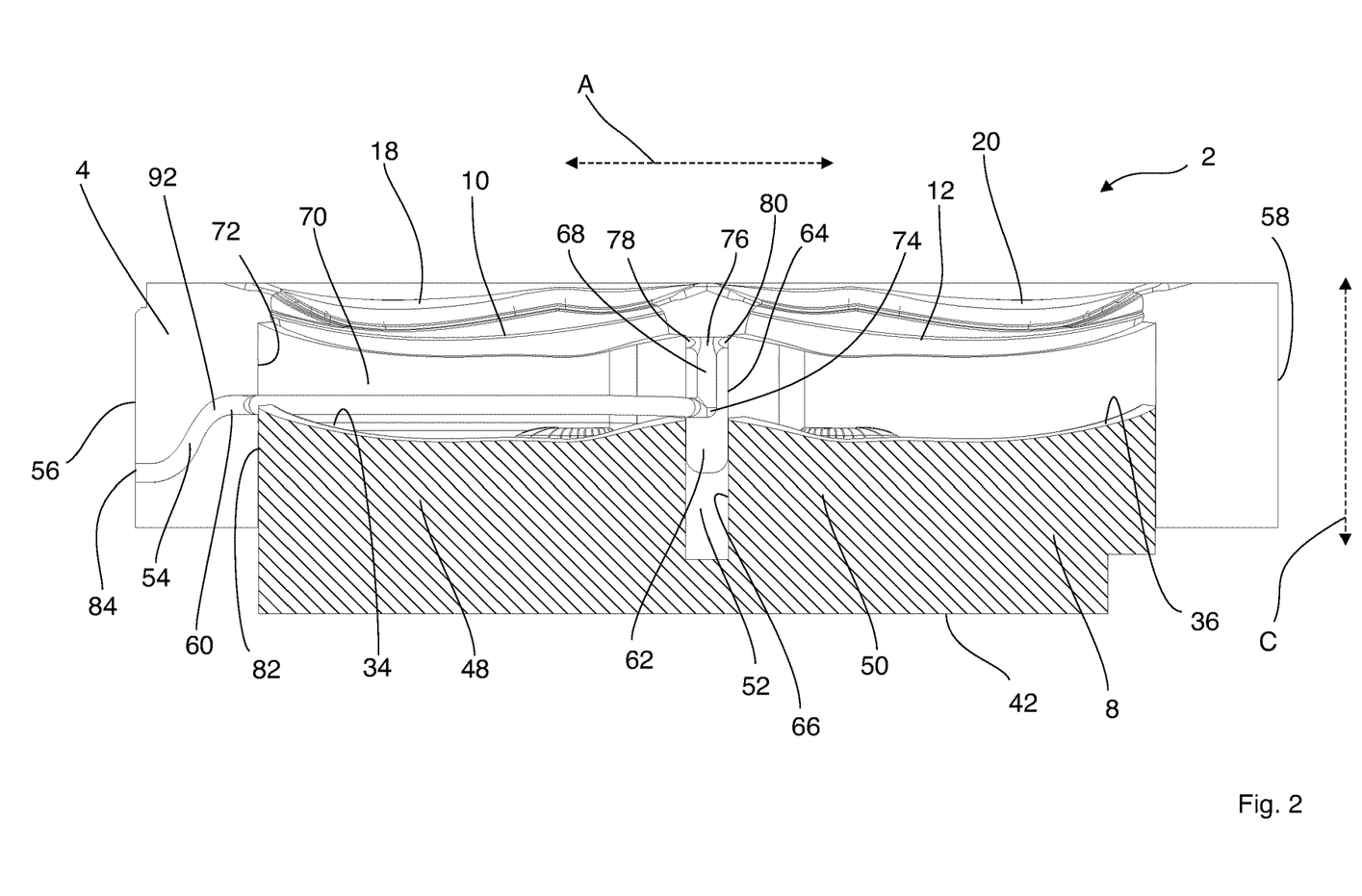
FIG. 2 is a side view of a side frame and a bottom frame of a footwear injection mould.

The first side frame 4 has a first inner surface 26 and a second inner surface 28, as shown in FIG. 2, which define at least parts of the mould cavities 10 and 12, which have a shape that forms at least parts of the outer surface of the moulded footwear part. The same may apply to the second side frame, which is not shown in FIG. 2, where the second side frame 6 has a first inner surface 30 and a second inner surface 32, which define at least parts of the mould cavities 10 and 12, which have a shape that forms at least parts of the outer surface of the moulded footwear part. The bottom frame 8 has a first upper surface 34 and a second upper surface 36 that define a bottom part of the first mould cavity 10 and the second mould cavity 12, respectively. The first upper surface 34 and the second upper surface 36 may define a lower part of the footwear part to be injected, such as the ground-contacting surface of the footwear part or a ground-facing surface of a sole part (such as a midsole). Alternatively, the first upper surface 34 and/or the second upper surface 36 may define a mounting surface, where e.g. an outsole part may be positioned on top of the first upper surface 34 and/or the second upper surface 36 prior to injection, and an upper surface of the outsole part (not shown) may define a part of the mould cavity, while a lower part of the outsole part may define a part of the ground-contacting surface of an injected footwear part.

The first side frame 4, the second side frame 6 and the bottom frame 8 are adapted to be inserted into standard footwear injection manufacturing equipment, such as a DESMA D522/24 or other compatible direct injection sole manufacturing machines, and may have a first outer surface 38, a second outer surface 40 and a bottom outer surface 42 that mate with corresponding parts of standard footwear injection manufacturing equipment.

The first side frame 4 and the second side frame 6 in a closed position may abut each other via a first contact surface 44 and a second contact surface 46 when the mould is in its closed state. When the footwear injection mould 2 is in its open state, the first contact surface 44 and the second contact surface 46 may be moved in a vertical direction (in the direction of the axis B) away from each other to allow the insertion of a lasted upper and/or the removal of a lasted upper from the mould cavity.

FIG. 2 is a side view of a footwear injection mould with a first side frame 4 and a bottom frame 8, where the bottom outer surface 42 of the bottom frame is visible. This view shows the first contact surface 44 of the first side frame, where the bottom frame 8 is lined up in a longitudinal direction A with the first side frame 4. The bottom frame 8 comprises a first bottom frame part 48 comprising a first upper surface 34 and a second bottom frame part 50, which comprises a second upper surface 36. The first bottom frame part 48 may be separated from the second bottom frame part 50 in a longitudinal direction A by a separation gap 52, allowing the first bottom frame part 48 to define a part of the lower boundary of the first mould cavity 10 and allowing the second bottom frame part 50 to define a part of the lower boundary of the second mould cavity 12. When the footwear mould 2 is in its closed position, the bottom frame 8 may be maneuvered upwards in a vertical direction C into the position seen in FIG. 3.

The first side frame 4 may have a first injection channel 54, where the injection channel may extend from a proximal end 56 of the first side frame 4 and in a longitudinal direction A towards the distal end 58 of the first side frame 4. The first injection channel 54 may be in the form of a groove 60 in the first contact surface 44, where the groove 60 extends in a longitudinal direction from the proximal end 56 towards a separation part 62, where the separation part is positioned in a longitudinal direction between the first mould cavity 10 and the second mould cavity 12, and where the separation part has an outer surface 64 which mates with an inner surface 66 of the separation gap 52 of the bottom frame 8. The groove 60 extends through a first cavity 70 of the first side frame 4 in a longitudinal direction along a side wall 72 of the first mould cavity 10.

The separation part 62 comprises a central injection channel 68 which has a first end 74 that is in fluid communication with the groove 60 of the first injection channel 54 inside the first cavity 70, allowing liquid injection material to be transported from the proximal end 56 towards the separation part 62. The central injection channel 68 has a second end 76, where the second end comprises a first output port 78 and a second output port 80. The first output port 78 is in fluid communication with the first mould cavity 10, while the second output port 80 is in fluid communication with the second mould cavity 12, allowing liquid material to be transported via the injection channel 54 from the proximal end 56 via the groove 60 and the central injection channel 68 into the first mould cavity 10 and the second mould cavity 12.

All the above disclosures of the first injection channel 54 in view of the first side frame may be applied to a similar injection channel that may be positioned in the second side frame. Thus, the first side frame may have a first injection channel 54 and/or the second side frame may have a second injection channel 54. Thus, one of the side frames may have an injection channel 54, or both side frames may have an injection channel 54.

Figure 3:
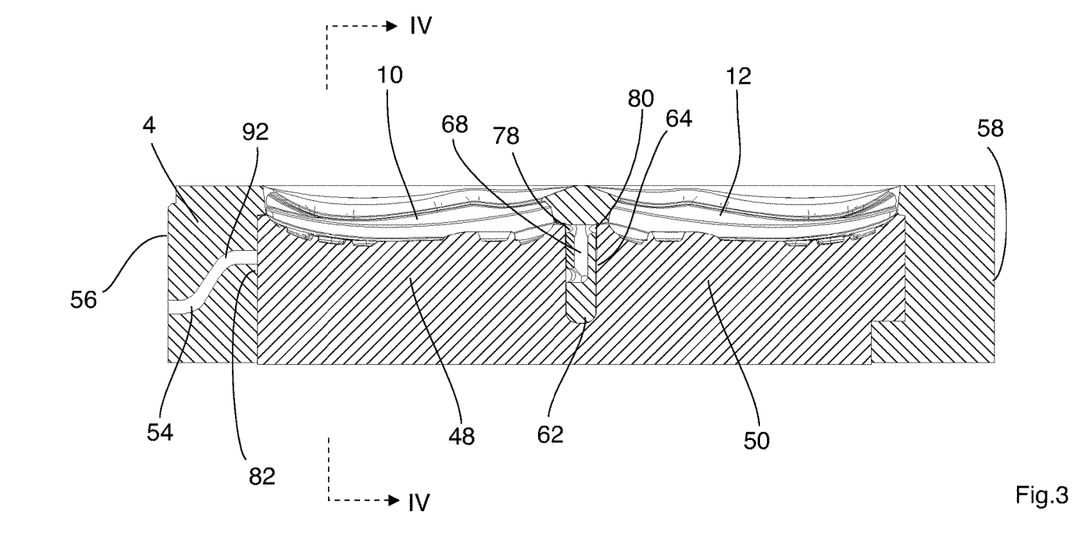
FIG. 3 is a sectional view of the footwear injection mould seen in FIG. 1 taken along the axis III-III.

The first injection channel 54 of the first side frame 4 and/or the second side frame 6 may be open in a vertical direction B and a longitudinal direction C when the footwear injection mould 2 is in its open state. When the footwear injection mould 2 is in its closed state, the first side frame 4 abuts the second side frame 6, and the bottom frame 8 is moved into its position, as seen in FIG. 3. The opposing side frame may close the first injection channel 54 in its longitudinal or vertical direction so that the opposing side frame may define a second groove (not shown), allowing the first injection channel 54 to have a closed diameter. Alternatively, the bottom frame may close the first injection channel 54. Thus, the opposing side frames 4, 6 may define a side wall of the first injection channel 54, and/or an outer (side) surface 82 of the first bottom frame part may define a side wall of the injection channel when the footwear injection mould 2 is in its closed state. Therefore, it may be understood that the groove 60 or the first injection channel 54 is open to the side when the mould is in its open state, but is closed to the side when the footwear injection mould 2 is in its closed state.

The first output port 78 and the second output port 80 may be in fluid communication with the first mould cavity 10 and the second mould cavity 12, respectively, when the mould is in its closed state. An alternative option may be that when the first side frame 4 and the second side frame 6 are in their closed position (as seen in FIG. 1) prior to the bottom frame 8 being moved into its closed position, the output ports 78 and 80 may be open into the mould cavities 10 and 12, where the movement of the bottom frame 8 into its closed position may close off the first output port 78 and the second output port 80, and where the inner surface 66 of the separation gap may move into position and close off the output ports 78 and 80, as seen in FIG. 3. Thus, the material may be injected prior to the vertical movement of the bottom frame 8 into its closed position.

Figure 4:
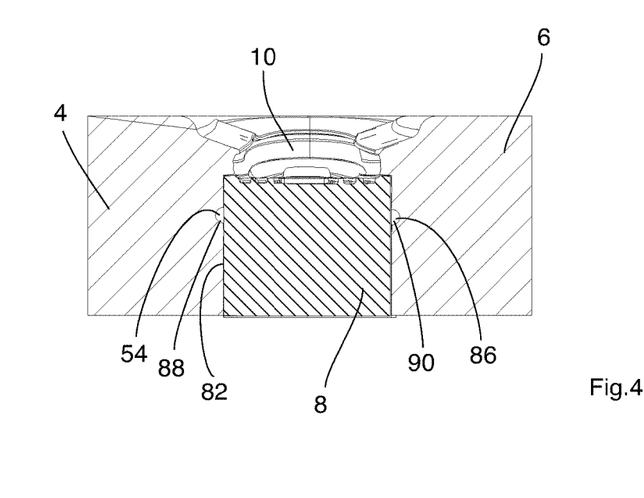
FIG. 4 is a sectional view of the footwear injection mould seen in FIG. 1 taken along the axis IV-IV.

FIG. 3 shows a sectional view taken along a longitudinal axis A of a footwear injection mould 2 in its closed position, where the second side frame 6 and the outer surface 82 of the first bottom frame 8 have completed the outer peripheral boundary of the first injection channel 54, so that the first injection channel 54 is in fluid communication from the input port 84 and to the output ports 78 and 80. The bottom frame and the side frames thus define parts of the injection channel, as may be seen from the sectional view in FIG. 4. Here it may be seen that the outer surface 82 of the bottom frame 8 defines a side wall that abuts the groove 60, which defines the injection channel. Furthermore, in accordance with the present disclosure, the second side frame 6 may also define a second injection channel 86, which is in fluid communication with the input port 84 and the output ports, where the first injection channel 54 may be split into a primary injection channel 88 and a secondary injection channel 90, which are on opposite sides of the bottom frame. This may increase the flow capacity of the first injection channel 54.

The proximal part 92 of the first injection channel 54 and the central injection channel 68 as well as the first output port and the second output port may be defined by the two side moulds so that the first contact surface 44 and the second contact surface 46 define each side of the injection channel. Thus, when the mould is in its open position, the first injection channel 54 may be incomplete, and one side frame (and/or the bottom frame) may only define parts of the periphery of the injection channel.

The use of the terms "first", "second", "third" and "fourth", "primary", "secondary", "tertiary", etc., does not imply any particular order, but are included to identify individual elements. Moreover, the use of the terms "first", "second", "third" and "fourth", "primary", "secondary", "tertiary", etc., does not denote any order or importance, but rather the terms "first", "second", "third" and "fourth", "primary", "secondary", "tertiary", etc., are used to distinguish one element from another. Note that the words "first", "second", "third" and "fourth", "primary", "secondary", "tertiary", etc., are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs used do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than a restrictive sense. The claimed invention is intended to cover all alternatives, modifications and equivalents.

REFERENCE NUMBERS

2 Footwear injection mould
4 First side frame
6 Second side frame
8 Bottom frame
10 First mould cavity
12 Second mould cavity
14 First opening
16 Second opening
18 Primary lip of first mould cavity
20 Secondary lip of first mould cavity
22 Primary lip of second mould cavity
24 Secondary lip of second mould cavity
26 First inner surface of first side frame
28 Second inner surface of first side frame
30 First inner surface of second side frame
32 Second inner surface of second side frame
34 First upper surface
36 Second upper surface
38 First outer surface
40 Second outer surface
42 Bottom outer surface
44 First contact surface
46 Second contact surface
48 First bottom frame part
50 Second bottom frame part
52 Separation gap
54 First injection channel
56 Proximal end of first side frame
58 Distal end of first side frame
60 Groove
62 Separation part
64 Outer surface of separation part
66 Inner surface of separation gap
68 Central injection channel
70 First cavity
72 Side wall of first cavity
74 First end of central injection channel
76 Second end of central injection channel
78 First output port
80 Second output port
82 Outer surface of first bottom frame part
84 Input Port
86 Second injection channel
88 Primary Injection channel
90 Secondary injection channel
92 Proximal part of the injection channel

The invention claimed is:

1. A footwear injection mold for direct injection molding of footwear soles onto lasted footwear uppers, the footwear injection mold comprising:
   a first mold cavity defining a first sole of a footwear part;
   a second mold cavity defining a second sole of a footwear part;
   the lasted uppers define the upper vertical boundaries of the first and second mould cavities;
   a first side frame defining at least a part of a first side of the first mold cavity and the second mold cavity;
   a second side frame defining at least a part of a second side of the first mold cavity and the second mold cavity; and
   a bottom frame defining at least a part of the first mold cavity and the second mold cavity,
   wherein at least one of the first side frame or the second side frame define(s) at least a part of an injection channel which is in fluid communication with the first mold cavity and the second mold cavity from outside of the footwear injection mold, and wherein the first mold cavity and/or the second mold cavity extend(s) along a longitudinal axis of the footwear injection mold.

2. The footwear injection mold in accordance with claim 1, wherein the injection channel is configured to be defined when the footwear injection mold is in a closed state.

3. The footwear injection mold in accordance with claim 1, wherein the injection channel comprises:
   a first output port in fluid communication with the first mold cavity, and
   a second output port in fluid communication with the second mold cavity.

4. The footwear injection mold in accordance with claim 3, wherein the first output port is in fluid communication with the second output port.

5. The footwear injection mold in accordance with claim 1, wherein the injection channel comprises an input port.

6. The footwear injection mold in accordance with claim 1, wherein the injection channel is further at least partly defined by the bottom frame.

7. The footwear injection mold in accordance with claim 1, wherein the injection channel defines an injection channel volume, where the injection channel volume is at least partly defined by at least one of:
   a side wall of the bottom frame,
   a side wall of the first side frame, or
   a side wall of the second side frame.

8. The footwear injection mold in accordance with claim 1, wherein the injection channel defines an injection channel volume, where the injection channel volume is at least partly defined by a side wall of the first side frame and a side wall of the second side frame.

9. The footwear injection mold in accordance with claim 1, wherein the first mold cavity is positioned in a proximal part of the footwear injection mold, and/or
   wherein the second mold cavity is positioned in a distal part of the footwear injection mold.

10. The footwear injection mold in accordance with claim 1, wherein the injection channel extends from a proximal end of the footwear injection mold and in a longitudinal direction towards a distal end of the footwear injection mold.

11. The footwear injection mold in accordance with claim 1, wherein the injection channel extends into a region between the first mold cavity and the second mold cavity.

12. The footwear injection mold in accordance with claim 1, wherein the injection channel extends into a distal end of the first mold cavity and/or a proximal end of the second mold cavity.

13. The footwear injection mold in accordance with claim 1, wherein the first mold cavity and/or the second mold cavity extend(s) along a longitudinal axis of the footwear injection mold.

14. The footwear injection mold in accordance with claim 1, wherein the footwear parts are footwear soles.

* * * * *